(12) United States Patent
Chishaki et al.

(10) Patent No.: US 6,252,949 B1
(45) Date of Patent: Jun. 26, 2001

(54) COMMUNICATION DEVICE

(75) Inventors: Ryoji Chishaki, Yamatokoriyama; Harumichi Tamura, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/263,086

(22) Filed: Mar. 8, 1999

(30) Foreign Application Priority Data

May 26, 1998 (JP) .................................................. 10-143612

(51) Int. Cl.⁷ ............................ H04M 11/00; H04M 1/00
(52) U.S. Cl. ...................... 379/100.14; 379/201; 379/355
(58) Field of Search ............................... 379/88.19, 88.2, 379/88.21–88.23, 100.06, 100.14, 142, 199–201, 209–210, 354–355, 67.1, 70, 72, 207; 358/400, 468

(56) References Cited

U.S. PATENT DOCUMENTS

| | | | |
|---|---|---|---|
| 5,479,500 | * 12/1995 | Matsuzaki et al. | 379/100.14 |
| 5,784,438 | * 7/1998 | Martinez | 379/88.19 |
| 5,832,060 | * 11/1998 | Corlett et al. | 379/209 |
| 5,917,615 | * 6/1999 | Reifman et al. | 358/400 |

FOREIGN PATENT DOCUMENTS 58-021960 * 2/1983 (JP) .............................. H04M/3/58
7-264379 10/1995 (JP) .

* cited by examiner

Primary Examiner—Curtis Kuntz
Assistant Examiner—George Eng
(74) Attorney, Agent, or Firm—Nixon & Vanderhye, P.C.

(57) ABSTRACT

A communication device provided with an automatic recall function can automatically turn off the recall function when it becomes unnecessary to recall a designated distant terminal. While monitoring whether an incoming call is detected or not by an incoming call detecting portion and whether a preset time is counted up by a timer (not shown), the main control portion detects a call signal incoming over a communication line through a detecting signal of the incoming call detecting portion, compares the calling telephone number, received and demodulated by a calling party's number demodulating portion, with a distant terminal telephone number stored in a called party's number storing portion and, only when both telephone numbers match, causes an announcing portion to notify a user of having received a call from the same distant terminal being called by using the automatic recall function.

5 Claims, 11 Drawing Sheets

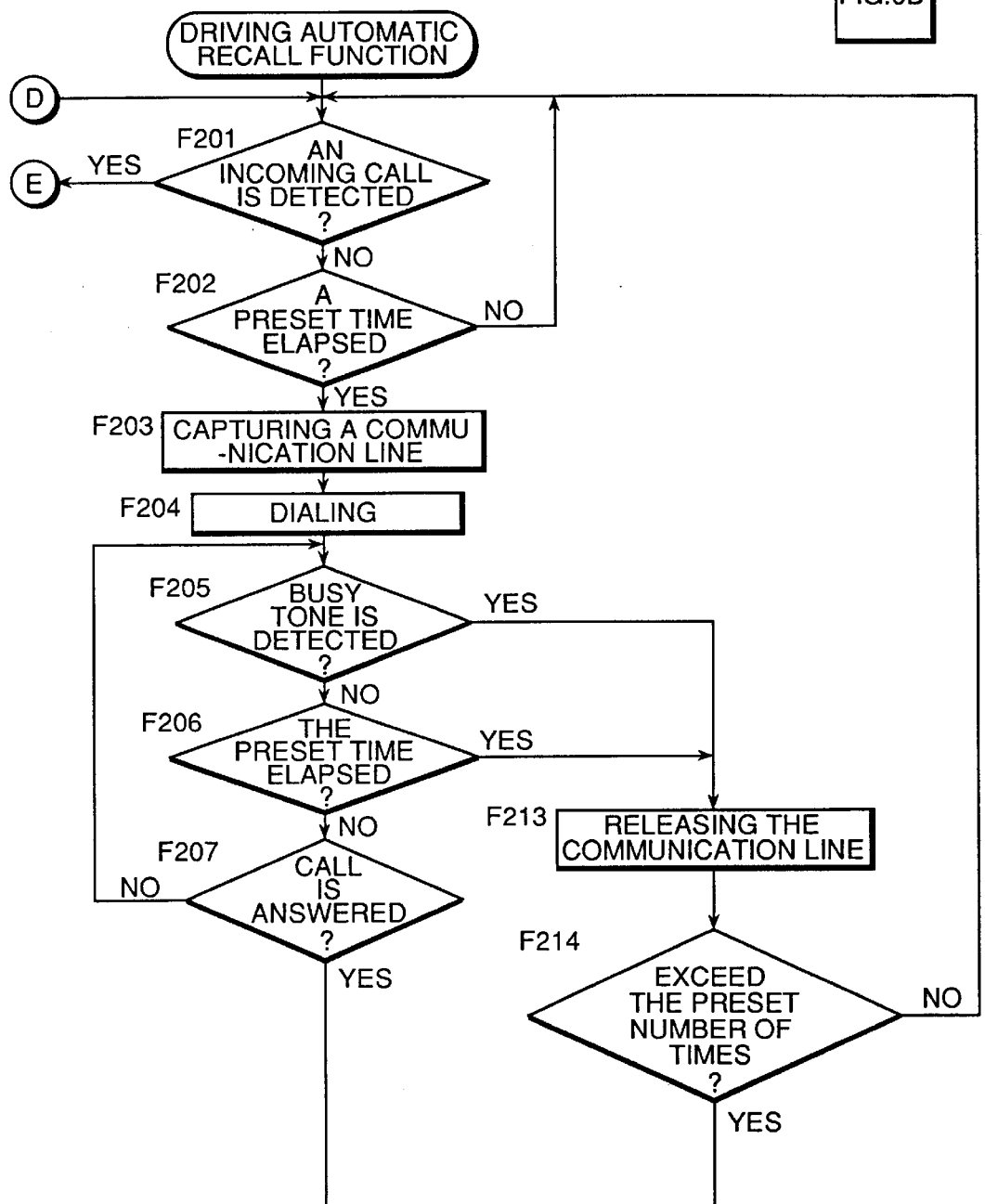

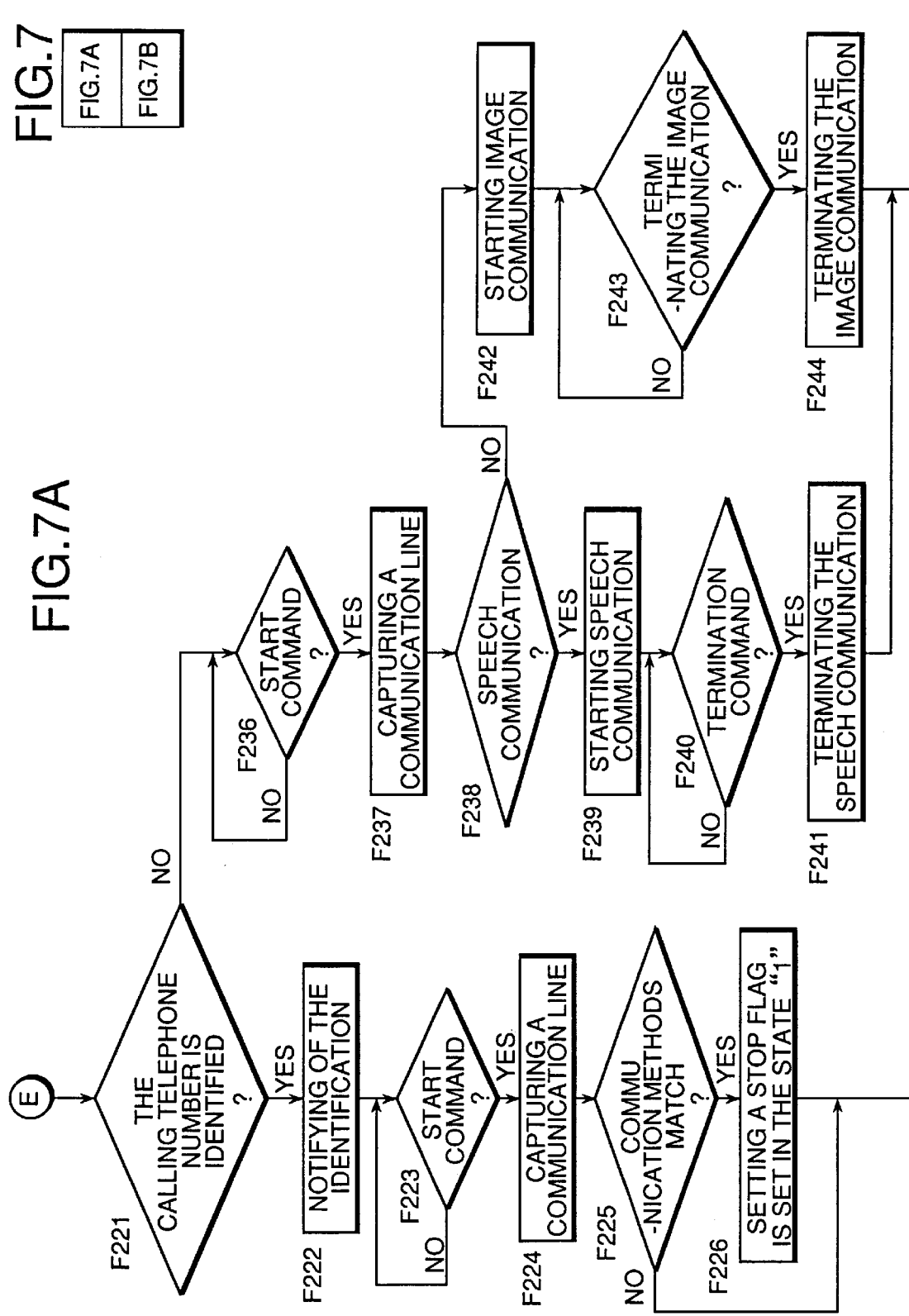

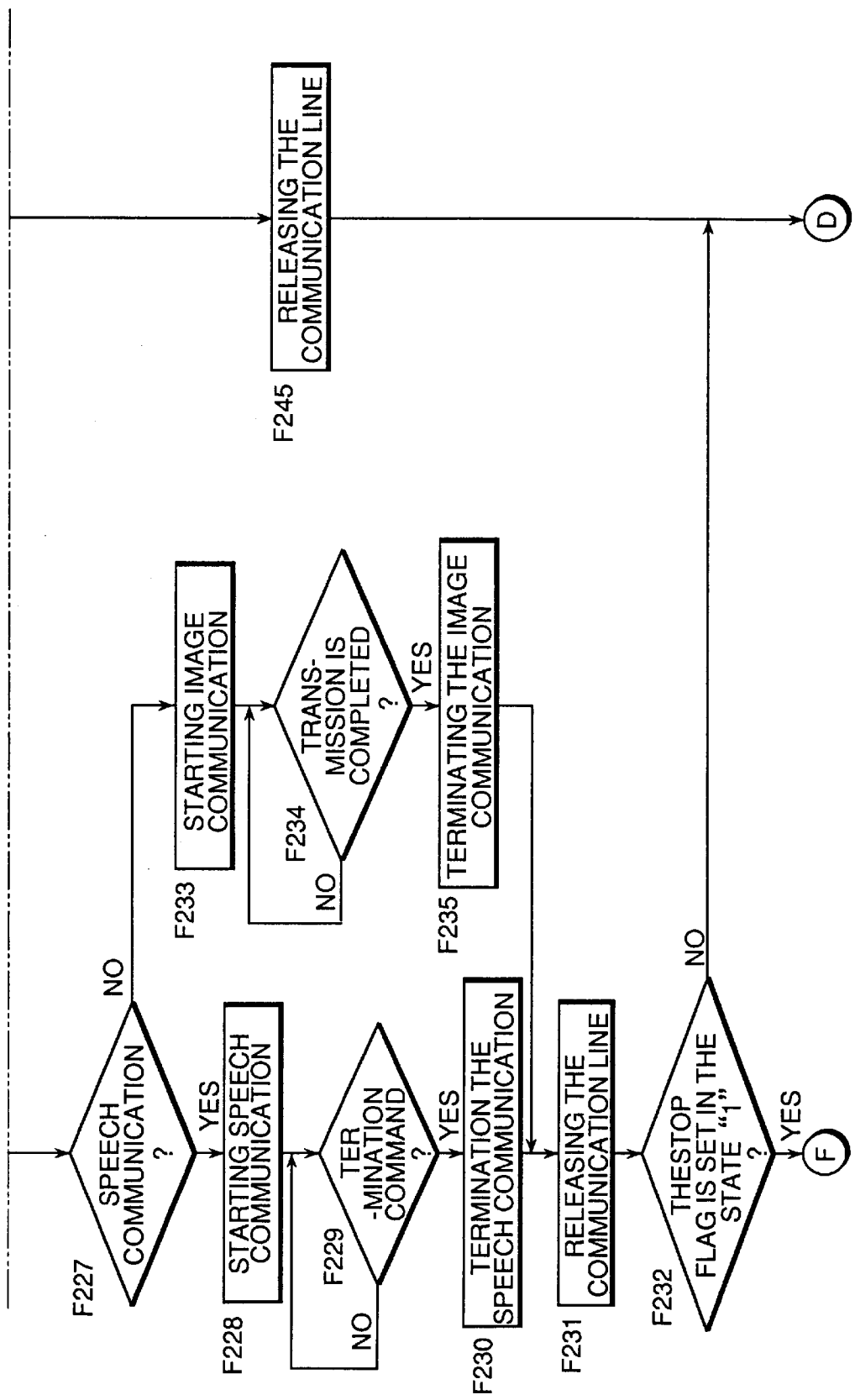

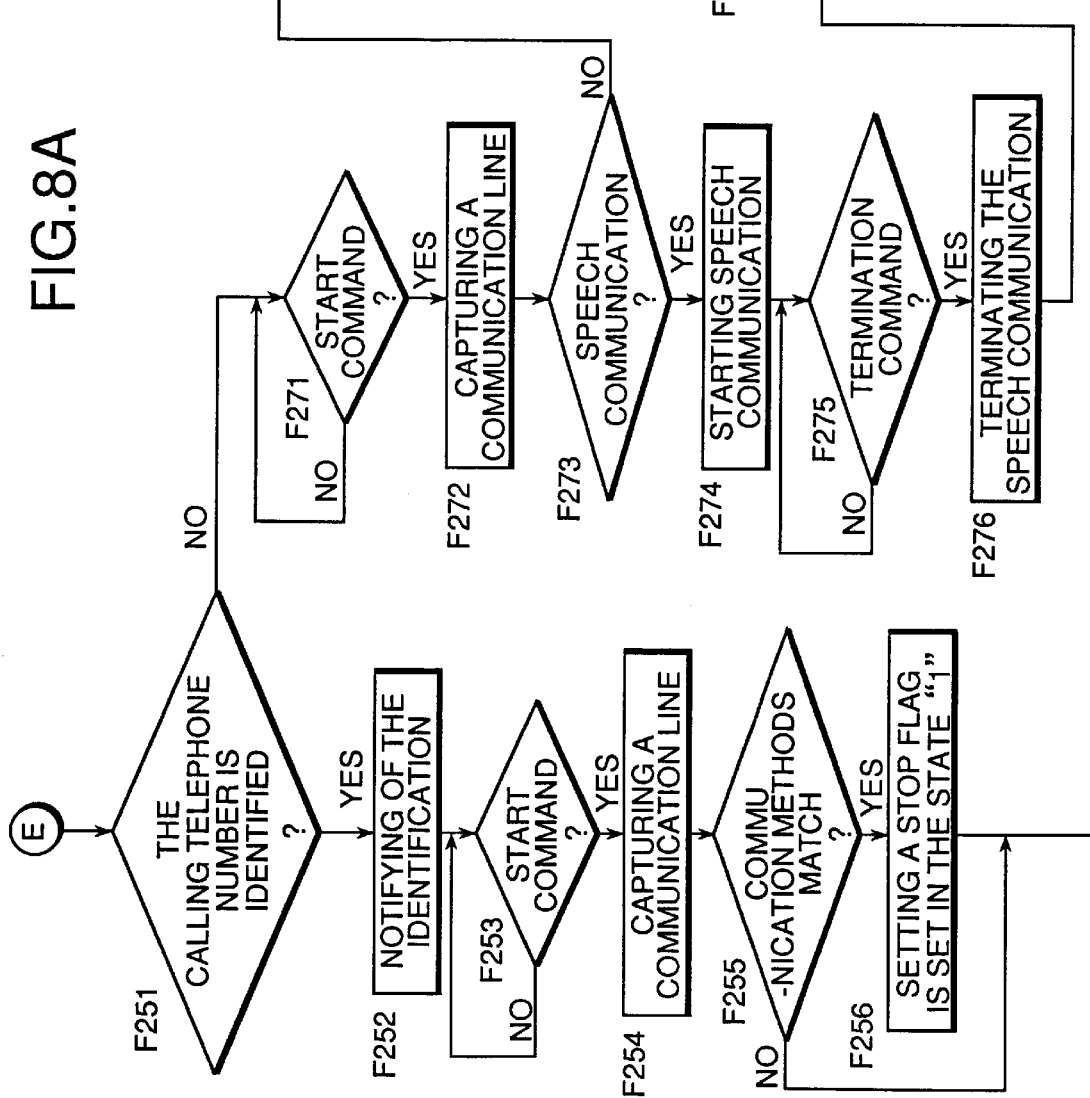

COMMUNICATION DEVICE

BACKGROUND OF THE INVENTION

The present invention relates to a communication device provided with an automatic recall facility.

Conventional communication devices such as telephone terminals and facsimile apparatuses are provided with an automatic recall function whereby an attempt to establish a call with a distant called terminal being busy or not responding is automatically repeated at certain intervals until the called terminal responds or by the specified number of attempts.

The above conventional devices, however, involve the following problems:

A user has to conduct a specified procedure on the device to stop the automatic recall driven in consequence of no answer having been received from a called designated terminal. On the other hand, it may happen that a communication device drives the automatic recall function to establish a call with a distant party designated to be recalled and a call from the same party is received in a pause after an attempt and the necessary communication with the designated party is completed. In this case, the user must recognize the need of canceling the recall function and conduct a predetermined procedure of stopping the recall function immediately after termination of the communication with the party. Otherwise, the party may be called again for the finished business by the automatic recall function. This recall is unpleasant for the called distant party.

SUMMARY OF THE INVENTION

The object of the present invention is to provide a communication device that can cancel the automatic recall function anytime when it becomes unnecessary to use, not requiring the user to do any complicated operation.

An another object of the present invention is to provide a communication device, which has an automatic recall function for repeatedly calling a designated distant terminal by automatically redialing a designated telephone number until the terminal responds to the call, which is further provided with a receiving means for receiving a telephone number of a calling party when a call from said calling party incomes over a communication line, an announcing means for giving a specified notification when the calling party's telephone number received by the receiving means is identified with the designated telephone number of the distant terminal to be repeatedly called by the automatic recall function being alive, and a control means for canceling the automatic recall function in response to a stop command input during the notification being given by the announcing means.

The communication device according to the above mentioned invention can receive a call from a distant party while an automatic recall function is alive for recalling a designated party, generates specified information by an announcing means when the received telephone number of the calling party is identified with that of the party designated to be recalled, and stop the automatic recall function by the control means when a stop command is given during the announcement. This device can thus notify a user of provably having the need to cancel; the automatic recall function when he or she conducts communication with a calling party whose telephone number corresponds to that of the party designated to be recalled.

Another object of the present invention is to provide a communication device, which has an automatic recall function for repeatedly calling a designated distant terminal by automatically redialing a designated telephone number at specified intervals until the distant terminal responds to the call, which is further provided with a receiving means for receiving a telephone number of a calling party when a call from said party incomes over a communication line, and a control means for canceling the automatic recall function when the calling party's telephone number received by the receiving means is identified with the designated telephone number of the distant terminal to be repeatedly called by the automatic recall function being alive.

The communication device according to the above mentioned invention receives a call from a party while an automatic recall function is alive for recalling a designated distant party and can stop the recall function by the control means if the calling telephone number received by the receiving means is identified with that of the party designated to be recalled. This device can thus automatically cancel the recall facility if a user conducts communication with a calling party whose telephone number is the number of the party designated to be recalled and accomplish the necessary business with the party, making it unnecessary to further call the party.

Another object of the present invention is to provide a communication device, which includes at least an image communication facility for transmitting/receiving image data and a speech communication facility for transmitting/receiving speech data and in which the control means causes the automatic recall function to be kept alive when the calling party's telephone number received by the receiving means is identified with the designated telephone number of the distant terminal to be repeatedly called by the automatic recall function being alive, and a method of communication originated with the call from the calling party differs a method of communication requested by the automatic recall function being in use.

The communication device according to the above mentioned invention can receive a call from a party while the automatic recall function is alive for recalling a designated distant party and can cause the control means to keep the recall function alive if the calling telephone number received by the receiving means is identified with that of the designated party but the communication method requested by the recall function differs from the current communication method. This device can thus cause the automatic recall function to continue calling attempts if the user conducts communication with a calling party whose telephone number is the number of the party designated to be recalled but cannot accomplish the necessary communication utilizing the current communication with the party.

A further object of the present invention is to provide a communication device, in which the control means cancels the automatic recall function when the calling party's telephone number received by the receiving means is identified with the designated telephone number of the distant terminal to be called by the automatic recall function being alive and a method of communication originated with the call from the calling party differs from a communication method requested by the automatic recall function being alive, and communication by a method requested by the automatic recall function is allowed to interrupt communication being conducted with the calling terminal.

The communication device according to the above mentioned invention can automatically cancel the automatic recall function when it received a call from a distant communication device whose telephone number corresponds to that of a distant terminal to be recalled by the recall function and the communication method requested by the received call differs from the communication method requested by the automatic recall function, but the latter communication could be conducted by interrupting the communication with the distant device, thus eliminating the need to do further calling the distant party.

A still further object of the present invention is to provide a communication device, which includes at least an image communication facility for transmitting/receiving image data and a speech communication facility for transmitting/receiving speech data and in which the control means causes the communication by a method requested by the automatic recall function to interrupt in the communication originated by the call from the calling party and then cancels the automatic recall function when the calling party's telephone number received by the receiving means is identified with the designated telephone number of the distant terminal to be repeatedly called by the automatic recall means being alive and the method of the communication being conducted with the calling party differs from the communication method requested by the automatic recall function being in use.

The communication device according to the above mentioned invention can accept a call from a party whose telephone number corresponds to a distant terminal designated to be recalled by the automatic recall function but requires the communication method different that requested by the recall function, conduct the communication with the calling party and causes the communication by the recall function to interrupt the current communication and cancel the recall function. This device can thus conduct the communication requested by the recall function by interrupting the current communication with the calling distant terminal and then automatically cancel the recall function.

BRIEF DESCRIPTION OF THE DRAWINGS

FIG. 6 shows the correct alignment of the drawing sheets for FIGS. 6A and 6B.

FIGS. 6A and 6B are a flowchart describing a basic procedure for controlling the operation of the communication device of FIG. 5 when using its automatic recall function.

FIG. 7 shows the correct alignment of the drawing sheets for FIGS. 7A and 7B.

FIGS. 7A and 7B are a flowchart describing an exemplified application procedure for controlling the operation of the communication device of FIG. 5 when using its automatic recall function.

FIG. 8 shows the correct alignment of the drawing sheets for FIGS. 8A and 8B.

FIGS. 8A and 8B are a flowchart describing another exemplified application procedure for controlling the operation of the communication device of FIG. 5 when using its automatic recall function.

PREFERRED EMBODIMENTS OF THE INVENTION

The preferred embodiments of the present invention will be described in detail by way of example and with reference to the accompanying drawings.

Figure 1:
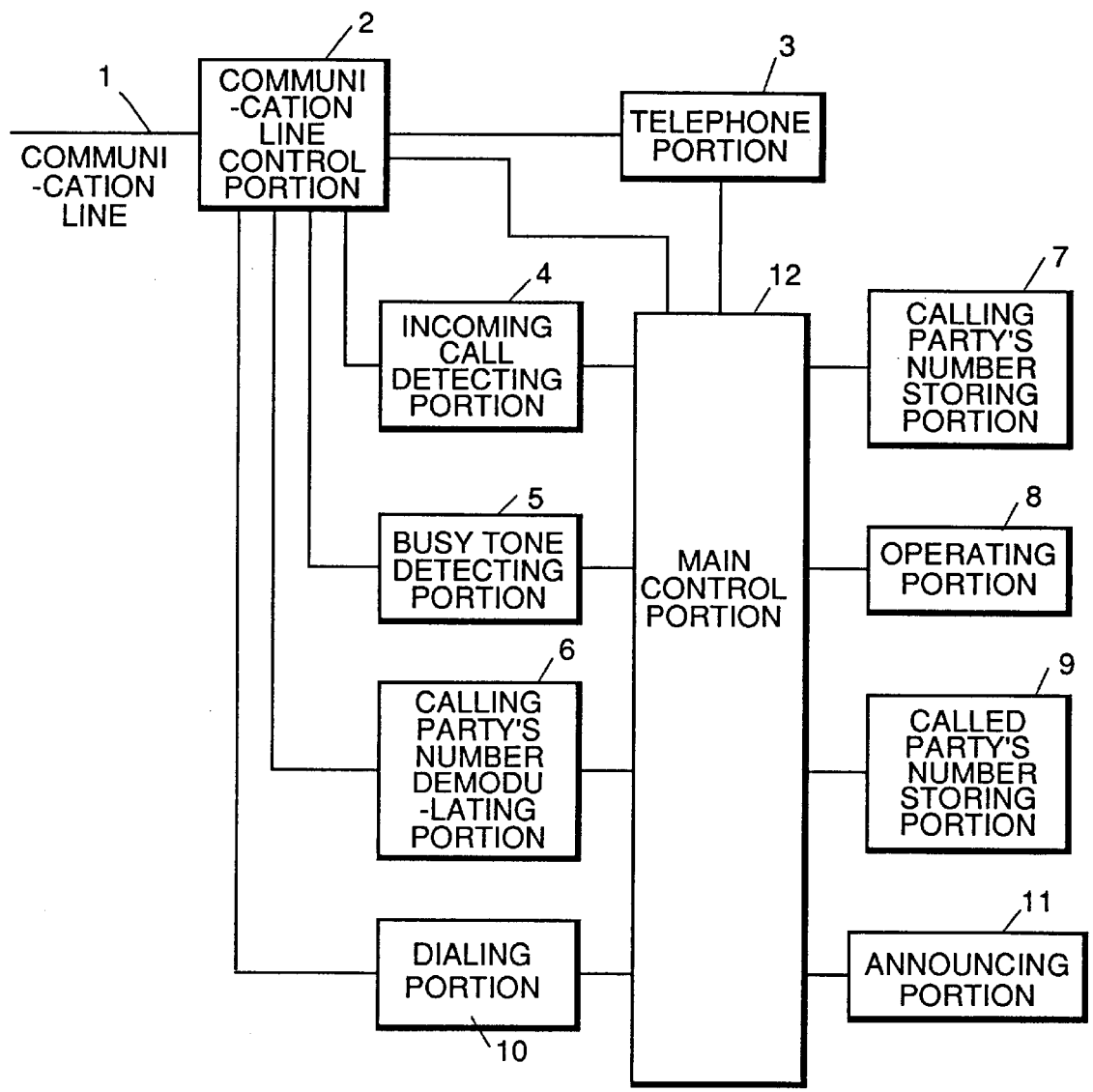
FIG. 1 is a schematic functional block-diagram showing an electrical construction of a communication device according to an embodiment of the present invention.
Figure 2:
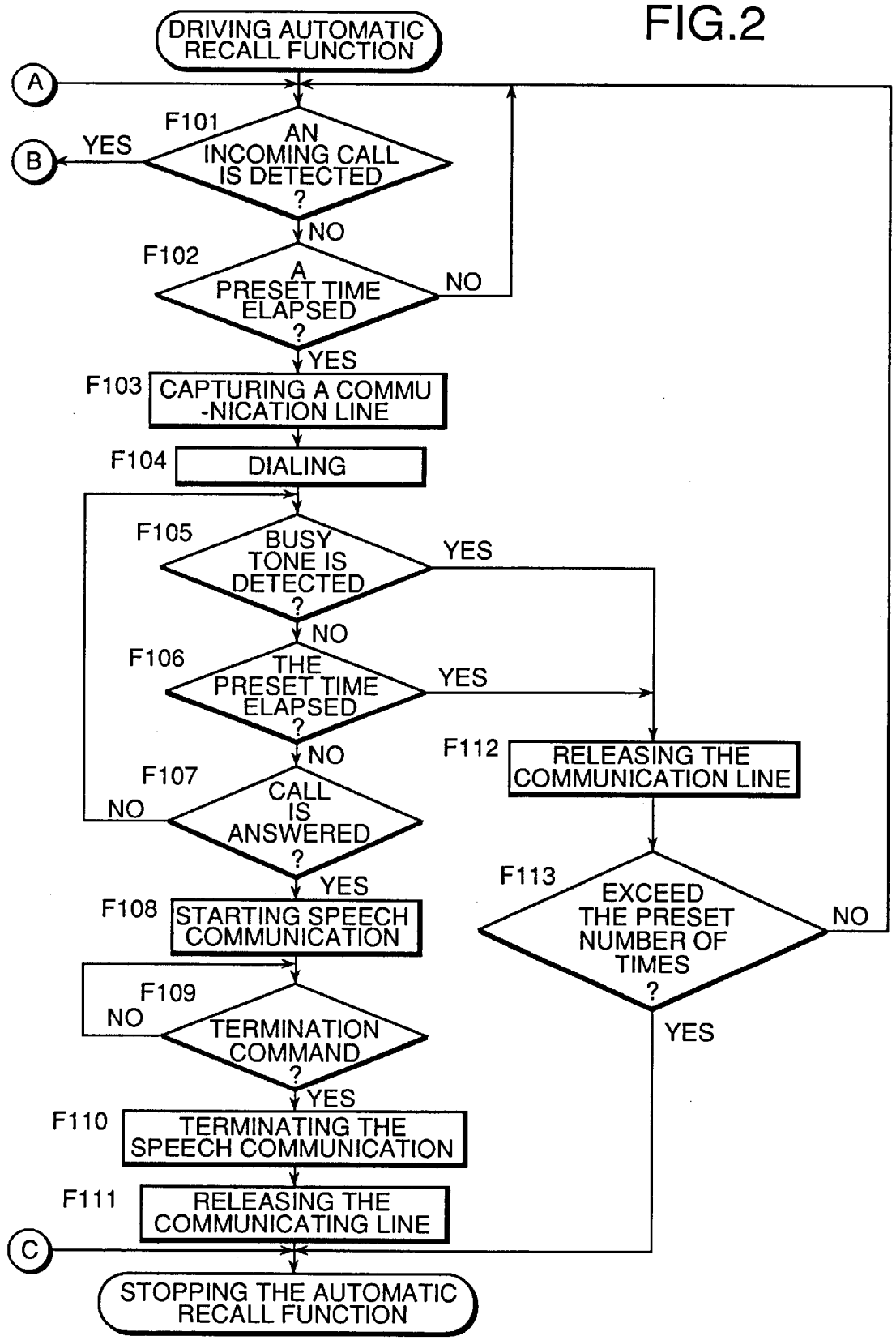
FIG. 2 is a flowchart describing a basic procedure for controlling the operation of the communication device of FIG. 1 when using its automatic recall function.
Figure 3:
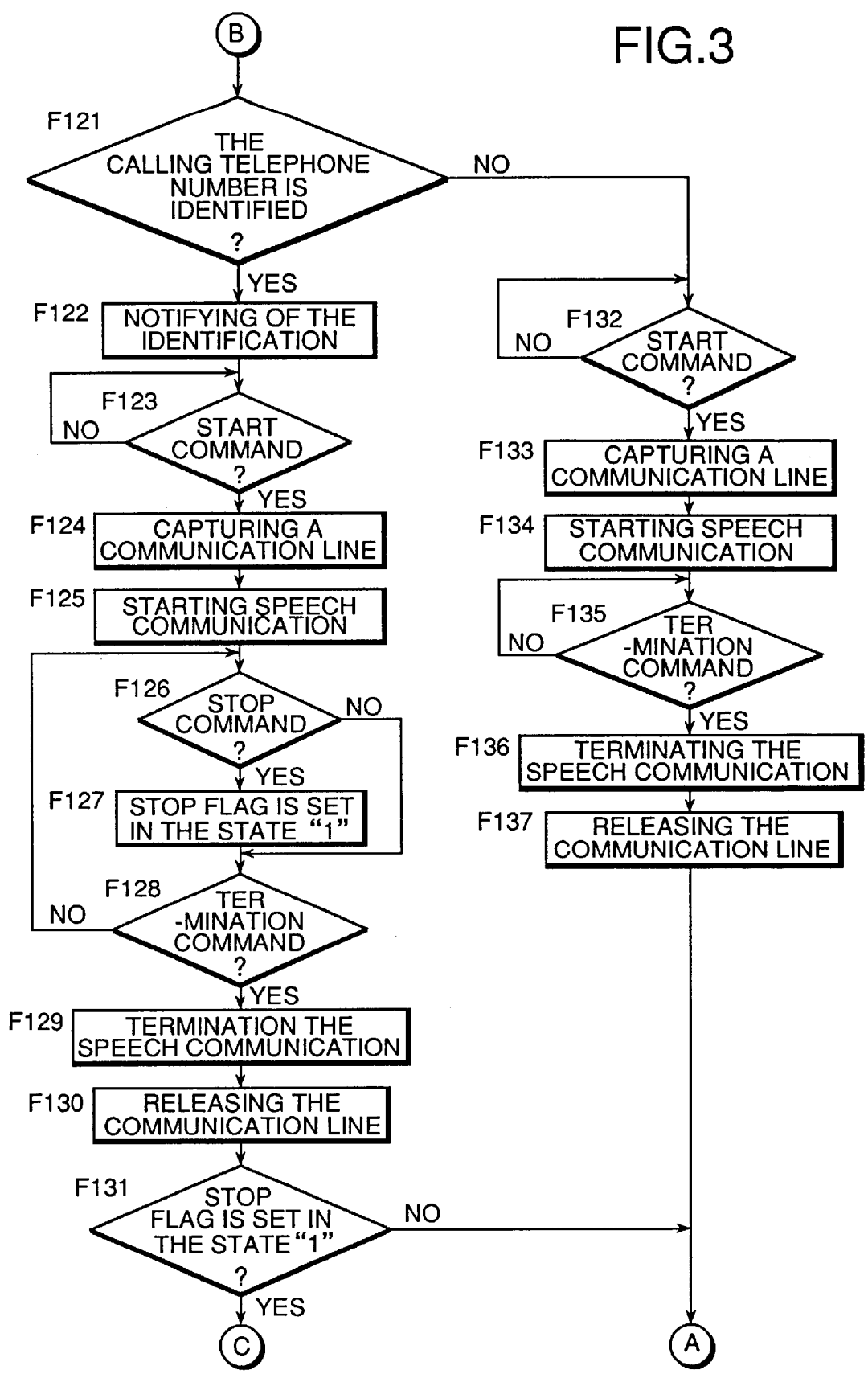
FIG. 3 is a flowchart describing an exemplified application procedure for controlling the operation of the communication device of FIG. 1 when using its automatic recall function.
Figure 4:
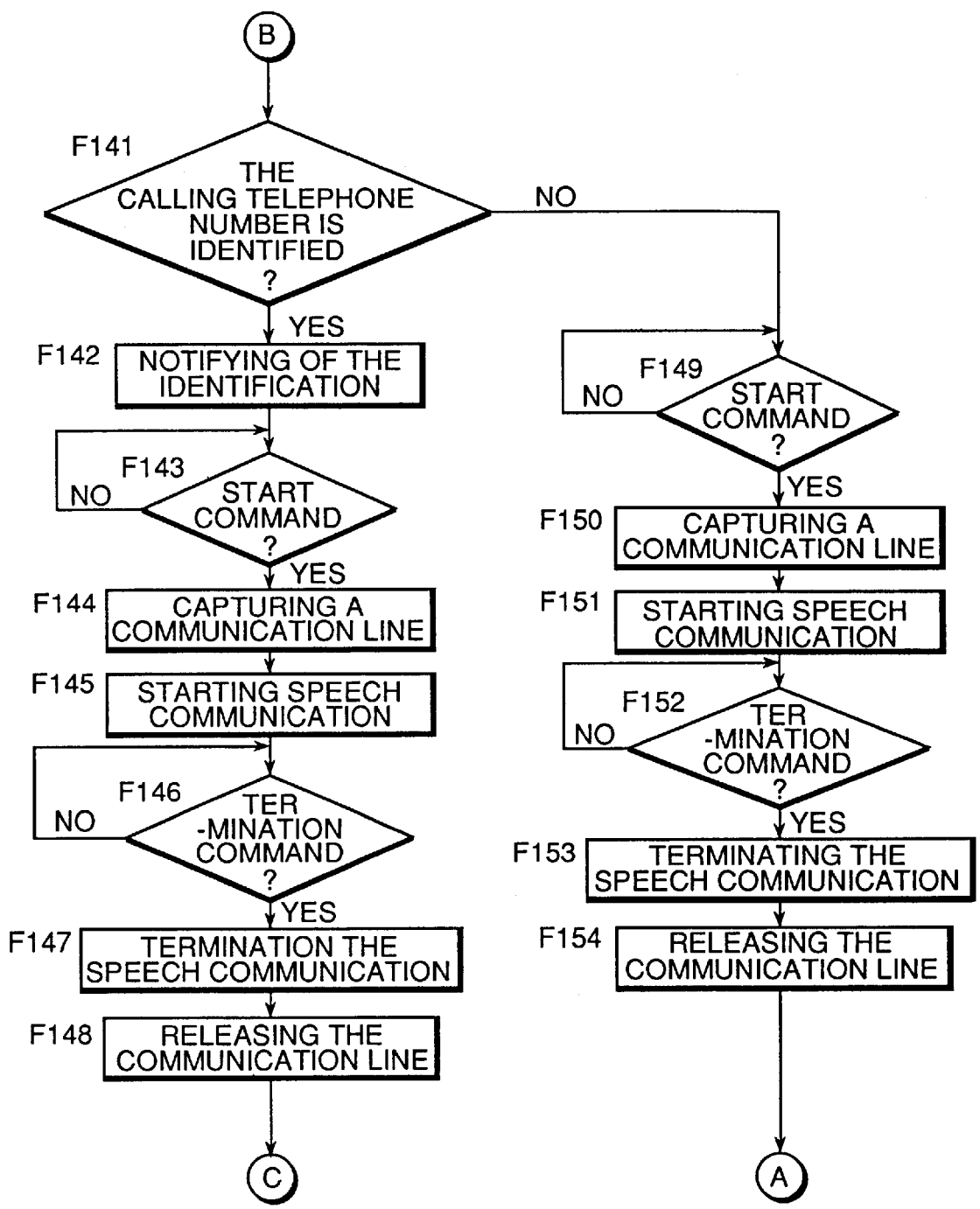
FIG. 4 is a flowchart describing another exemplified application procedure for controlling the operation of the communication device of FIG. 1 when using its automatic recall function.

FIG. 1 is a schematic functional block-diagram showing an electrical construction of a communication device according to an embodiment of the present invention. FIG. 2 is a flowchart describing a basic procedure for controlling the operation of the communication device of FIG. 1 when using its automatic recall function. FIG. 3 is a flowchart describing an exemplified application procedure for controlling the operation of the communication device of FIG. 1 when using its automatic recall function. FIG. 4 is a flowchart describing another exemplified application procedure for controlling the operation of the communication device of FIG. 1 when using an automatic recall function.

Figure 5:
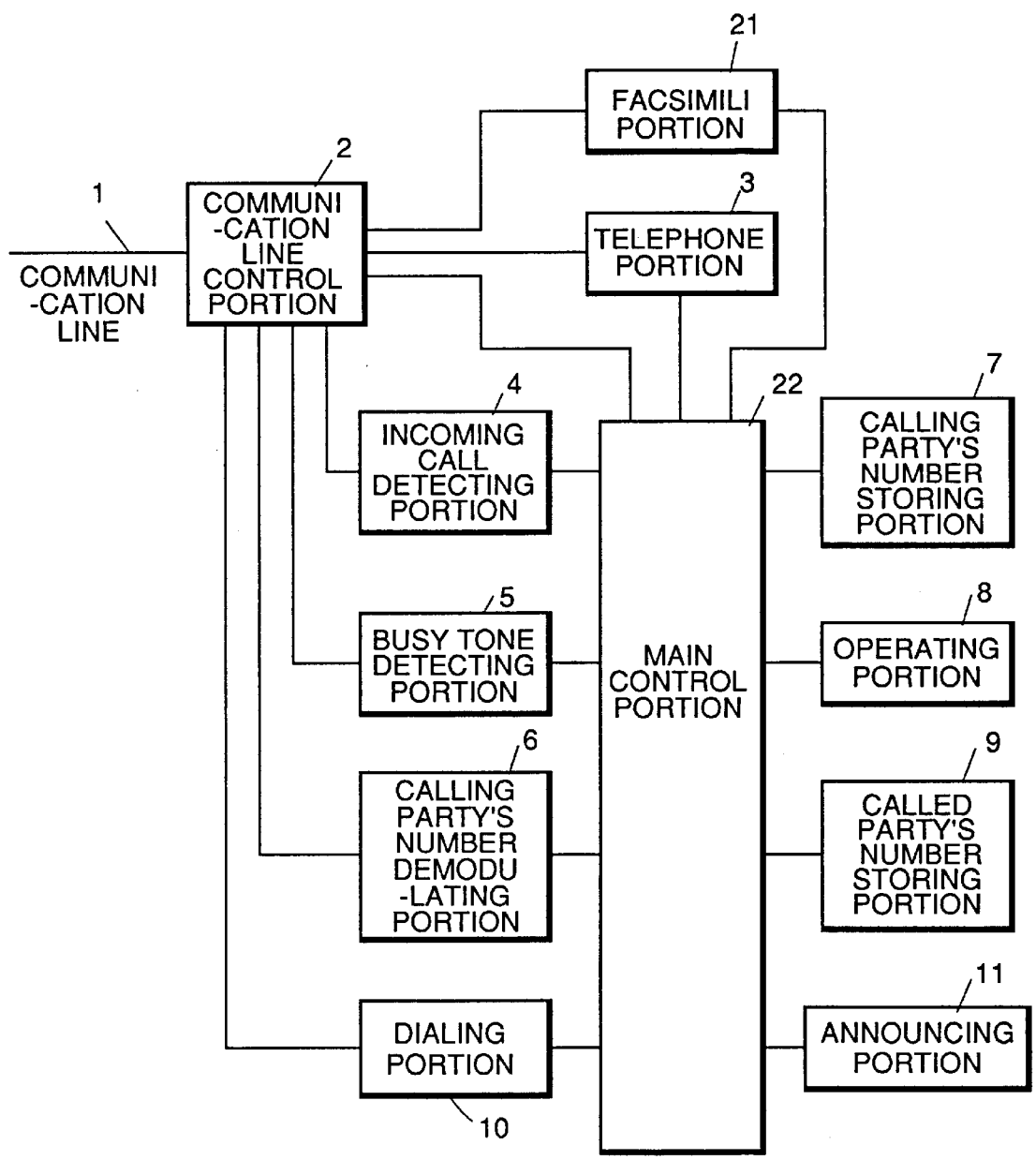
FIG. 5 is a schematic functional block-diagram showing an electrical construction of a communication device according to another embodiment of the present invention.
Figure 6B:
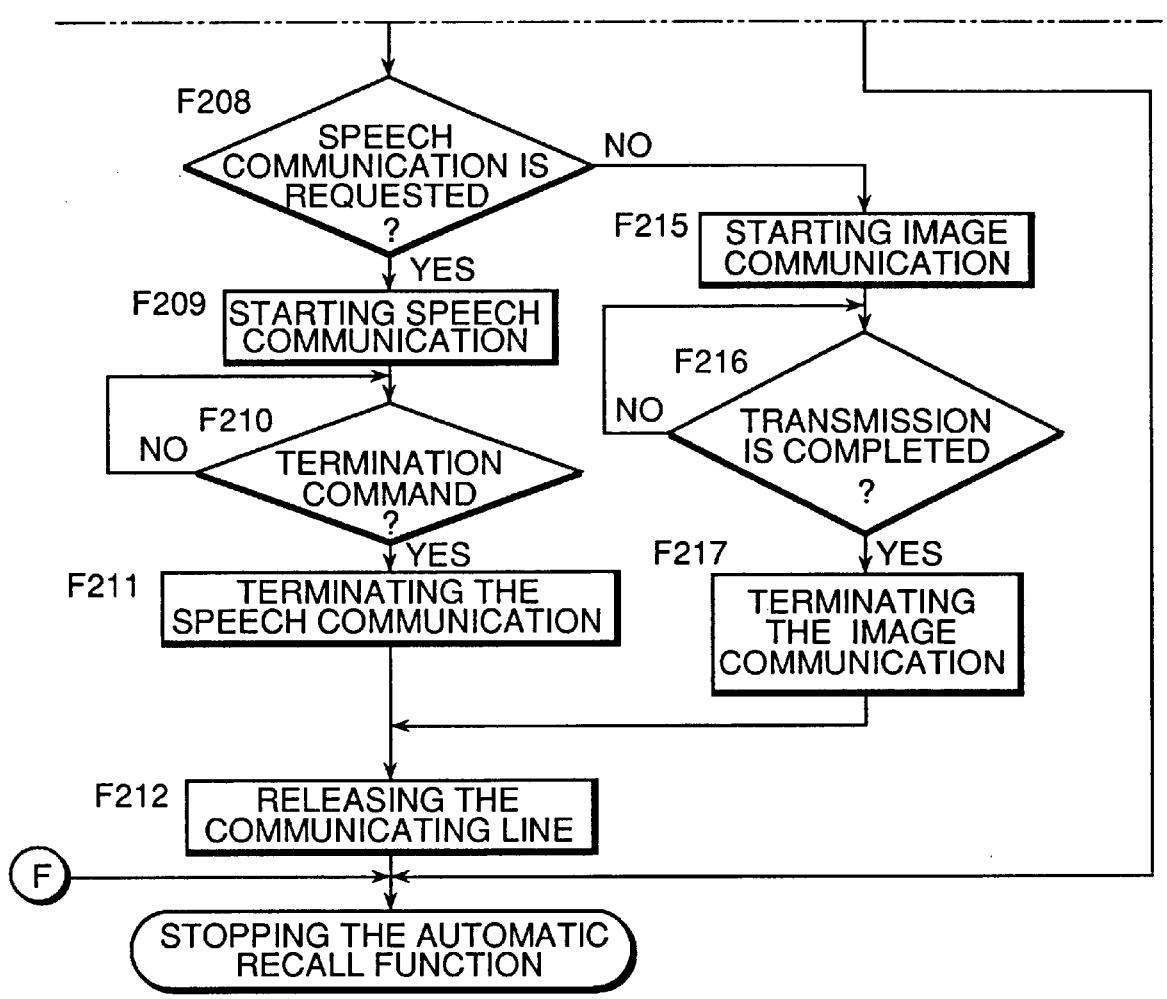
Figure 8B:
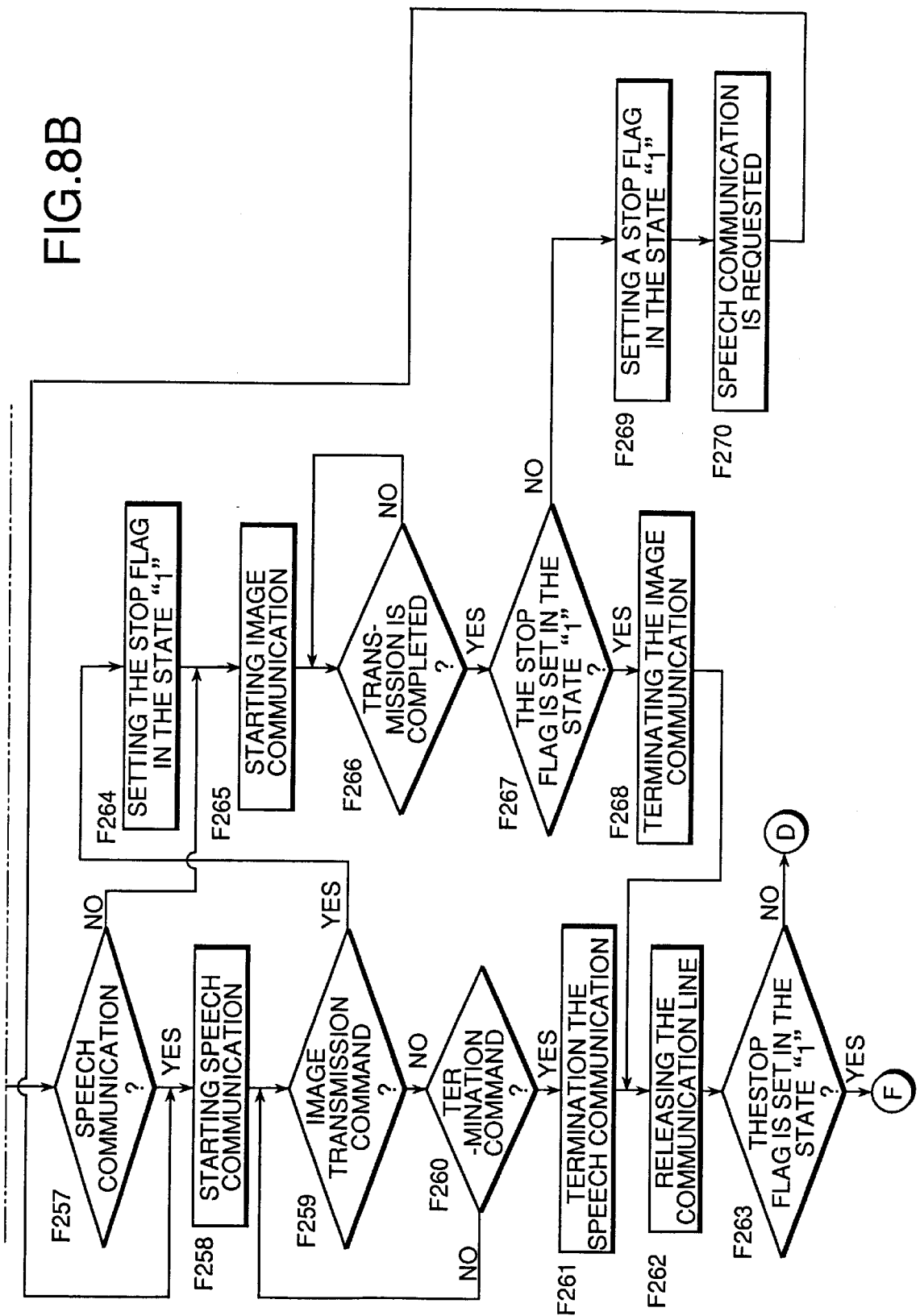

FIG. 5 is a schematic functional block-diagram showing an electrical construction of a communication device according to another embodiment of the present invention. FIGS. 6A and 6B are a flowchart describing a basic procedure for controlling the operation of the communication device of FIG. 5 when using its automatic recall function. FIGS. 7A and 7B are a flowchart describing an exemplified application procedure for controlling the operation of the communication device of FIG. 5 when using its automatic recall function. FIGS. 8A and 8B are a flowchart describing another exemplified application procedure for controlling the operation of the communication device of FIG. 5 when using its automatic recall function.

EMBODIMENT ONE

A communication device according to an embodiment of the present invention will be described below with reference to FIGS. 1 to 4.

In FIG. 1, there is shown a communication line 1 through which a communication device is connected with a distant communication device by means of a switching system (not shown), a communication line control portion 2 for capturing/releasing the communication line 1 to form a communication channel with the distant communication device through the captured communication line 1 and a telephone portion 3 for transmitting/receiving speech data to/from the distant communication device.

In FIG. 1, there is shown a call detecting portion 4 for detecting a call signal incoming over the communication line 1, a busy tone detecting portion 5 for detecting a busy tone incoming over the communication line 1, a calling party information demodulating portion 6 for receiving calling party information incoming over the communication line and demodulating a telephone number of the calling party from the received information, a calling party's number storing portion 7 for storing the telephone number of the calling party demodulated by the calling party's number demodulating portion 6, an operating portion 8 having numeric keys for inputting a telephone number and functional keys, a called party's number storing portion 9 for storing a telephone number of the called party input by the operating portion, a dialing portion 10 for calling a distant terminal according to the terminal telephone number stored in the calling party's number storing portion 7 and the called party's number storing portion 9 or the telephone number input through the operating portion 8 and an announcing portion 11 for notifying a user of specified information in form of voice, light, vibration or a message.

Numeral 12 designates a main control portion that controls capture and release of a communication line by the communication line control portion 2, speech communication by the telephone portion 3, write and read operations for the calling party's number storing portion 7 and the called party's number storing portion 9, calling signal transmission by the dialing portion 10 and announcement by the announcing portion 11 respectively according to a detection signal from the incoming call detecting portion 4, a detection signal from a busy-tone detecting portion 5, a demodulated signal from the calling party's number demodulating portion 6, a telephone number stored in the calling party's number storing portion 9, command signals input through the operating portion 8 and a called party's telephone number stored in the called party's number storing portion 9.

The operation of the above-described communication device using its automatic recall function will be described below by way of example with reference to flowcharts shown in FIGS. 2 and 3.

Upon receipt of a distant-terminal telephone number input by a user through the operating portion 8, the communication device causes the communication line control portion 2 to capture a transmission line 1 and the dialing portion 10 to transmit a calling signal by dialing the telephone number and then stores the input telephone number in the called party's number storing portion 9. With a busy-tone from the called terminal, detected by the busy-tone detecting portion 5, or no response from the called terminal for a specified period, the communication device operates the communication line control portion 2 to release the communication line 1, stops transmission of the call signal by the dialing portion 10 and then drives the automatic recall function.

After the automatic recall function was driven, the main control portion 12 monitors whether a call signal is detected by the call detecting portion 4 and whether a certain preset time elapsed according to a signal of a timer (not shown) (Steps F101 and F102).

If the preset time elapsed (Step F102), the main control portion 12 controls the communication line control portion 2 to capture the communication line 1 (Step F103) and causes the dialing portion 10 to call the distant telephone number stored in the called party's number storing portion 9 (Step F104).

When the called distant terminal responds to the transmitted call without detection of a busy-tone by the busy-tone detecting portion 5 before a certain preset time elapsed (Step F107), the main control portion 12 controls the telephone portion 3 to begin the transmission/receipt of speech data to/from the distant terminal (Step F109). With a termination command input through the operating portion 8, the main control portion 12 causes the telephone portion 3 to terminate the communication with the distant terminal (Step F110), controls the communication line control portion 2 to release the communication line 1 (Step F111) and turns off the recall function.

When a busy-tone incoming over the communication line 1 was detected by the busy-tone detecting portion 5 after transmission of the call (Step F105) or no response from the called distant terminal was received before the elapse of the preset time (Step F106), the main control portion 12 controls the communication line control portion 2 to release the communication line 1 (Step F112) and examines how many times the calling attempt was repeated (Step F113). The main control portion 12 turns OFF the automatic recall function if a calling attempt has been repeated by the certain preset number of times. If the number of recalls did not reach the preset value, the main control portion 12 executes again the above described control procedure (Steps F101 to F113) including the monitoring operations for detecting a call incoming over the communication line by the call detecting portion 4 and the elapse of the preset time according to the timer (not shown).

Having detected a calling signal transmitted from a distant terminal over the communication line 1 according to the detection signal of the call detecting portion 4 (Step F101) in the above described monitoring stage of the basic flowchart, the main control portion 12 compares the calling telephone number received and demodulated by the calling party's number demodulating portion 6 with the distant terminal telephone number stored in the called party's number storing portion 9 (Step F121). When the telephone number of the calling party was identified with the telephone number of the called distant terminal, the main control portion 12 causes the announcing portion 11 to notify a user of having received a call from the same distant terminal being called by the automatic recall function (Step F122).

The announcement may be conducted for example by lighting a specific LED, displaying a message of receiving a call from a distant terminal to be recalled by the automatic recall function, generating a sound signal or vibrating the device body at a specified frequency for the device being an easily portable telephone set.

When a command to start the speech data transmission is input through the operating portion 8 during the announcement being given (Step F123), the main control portion 12 causes the communication line control portion 2 to capture the communication line 1 (Step F124) and controls the telephone portion 3 to begin the transmission/receipt of speech data to/from the calling terminal (Step F125). A command to stop the automatic recall function is then given through the operating portion 8 (Step F126) and the main control portion 12 sets a Stop Flag in the state <1> (Step F127). When a command to terminate the speech communication is input through the operating portion 8 (Step F128), the main control portion 12 causes the telephone portion 3 to terminate the speech communication with the calling terminal (Step F129) and operates the communication line control portion 2 to release the communication line 1 (Step F130). The main control portion 12 then examines whether the Stop Flag is set in the state <1> indicating that the command to stop the automatic recall function has been input (Step F131) and cancels the automatic recall function when the Stop Flag is set in the state <1>. If the Stop Flag is not set in the state <1>, the main control portion 12 performs the basic control procedure (Steps F101 to F113). The main control portion 12 before executing the basic control steps may operate the announcing portion 11 to give the user a request of confirming whether the automatic recall function needs not to be canceled.

The main control portion 12 now executes the basic control procedure monitoring whether a call from a distant terminal is detected by the incoming call detecting portion 4 and whether the preset time elapsed or not according to a signal from the timer (not shown). When a calling signal incoming through the communication line 1 is detected by the call detecting portion 4 (Step F101) and the calling terminal telephone number received and demodulated by the calling party's number demodulating portion 6 does not correspond with the distant terminal telephone number stored in the called party's number storing portion 9 (Step F121), the main control portion 12 upon receipt of a speech communication starting command input through the operating portion 8 (Step F132) operates the communication line control portion 2 to capture the communication line 1 (Step F133) and causes the telephone portion 3 to start the transmission of speech-data to and from the calling terminal (Step F134). When a command to terminate the speech-data transmission is given through the operating portion 8 (Step F135), the main control portion 12 controls the telephone portion 3 to terminate the speech communication with the calling terminal (Step F136) and causes the communication line control portion 2 to release the communication line 1 (Step F137). Then, the main control portion 12 conducts again the basic operating procedure (Steps F101 to F113).

The above-described control procedure enables the user of the communication device to know the case that a calling party with whom the user communicates happens to be the party who will be called by the automatic recall function driven upon the user's request. This procedure can also inform the user of having need to stop the automatic recall function. Another example of the control operation procedure of the communication device using its automatic recall function will be described below according to the flow chart shown in FIG. 4. A basic control procedure of this embodiment is identical to that shown in the foregoing embodiment and, therefore, omitted from the further description. Now, the main control portion 12 is performing the basic control procedure monitoring whether a call from a distant terminal is transmitted or not according to a detection signal from the incoming call detecting portion 4 and whether the preset time elapsed or not according to a signal from the timer (not shown). When a calling signal incoming through the communication line 1 in the meantime is detected by the incoming call detecting portion 4 the main control portion 12 compares the calling party's telephone number received and demodulated by the calling party's number demodulating portion 6 with the distant terminal telephone number stored in the called party's number storing portion 9 (Step F141). If the calling party's telephone number corresponds with the telephone number of the distant terminal to be repeatedly called by the automatic recall function, the main control portion 12 causes the announcing portion 11 to inform a user of having received a call from the distant terminal being called by the automatic recall function (Step F142).

A command to start the speech data transmission is input through the operating portion 8 during the announcement (Step F143). The main control portion 12 causes the communication line control portion 2 to capture the communication line 1 (Step F144) and controls the telephone portion 3 to begin the speech communication with the calling terminal (Step F145). Then, upon receipt of a command to terminate the speech communication through the operating portion 8 (Step F146), the main control portion 12 causes the telephone portion 3 to finish the speech data communication with the calling terminal (Step F147), operates the communication line control portion 2 to release the communication line 1 (Step F148) and turns OFF the automatic recall function.

When the main control portion 12 in the above-described monitoring state detects a calling signal incoming through the communication line 1 according to the detection signal of the call detecting portion 4 and determines the calling terminal's telephone number received and demodulated by the calling party's number demodulating portion 6 to be different from the distant terminal telephone number stored in the called party's number storing portion 9 (Step F141), it receives a communication start instruction through the operating portion 8 (Step F149), operates the communication line control portion 2 to capture the communication line 1 (Step F150) and causes the telephone portion 3 to start the transmission of speech data to and from the calling terminal (Step F151). When a command to terminate the communication is then input through the operating portion 8 (Step F152), the main control portion 12 causes the telephone portion 3 to terminate the speech data communication with the calling terminal (Step F153), operates the communication line control portion 2 to release the communication line 1 (Step F154) and, then, executes again the basic control procedure.

The above-described control procedure enables the communication device to notify the user of the fact that a calling party with whom the user communicates is the party who is called by the automatic recall function driven upon the user's request and he or she can accomplish the necessary business with the party. Then, the device can automatically turn off the automatic recall function as it becomes unnecessary to use.

ANOTHER EMBODIMENT

A communication device according to another aspect of the present invention will be described below with reference to FIGS. 5, 6A, 6B, 7A, 7B, 8A and 8B, where components similar to those shown in FIG. 1 are given the same reference numerals and will not be further explained.

In FIG. 5, the communication device includes a facsimile portion 21 for transmitting/receiving image data to/from a distant communication device over a transmission channel formed by a communication line control portion 2 and a main control portion 22 that conducts control operations for capturing/releasing a communication line by the communication line control portion 2, speech-data communication by the telephone portion 3, reading/writing data from/into a calling party's number storing portion 7, reading/writing data from/into a called party's number storing portion 9, calling signal transmission by a dialing portion 10, announcement by an announcing portion 11 and image transmission by the facsimile portion 21, respectively, according to a control signal from a telephone portion 3, a detection signal from an incoming call detecting portion 4, a detection signal from a busy-tone detecting portion 5, a demodulated signal from a calling party's number demodulating portion 6, a calling party's telephone number stored in a calling party's number storing portion 7, commands input through an operating portion 8, a called party's telephone number stored in a called party's number storing portion 9 and a control signal from the facsimile portion 21.

The operation of the above-described communication device using its automatic recall function will be described below by way of example with reference to flowcharts shown in FIGS. 6A, 6B, 7A and 7B.

A distant-terminal telephone number was input by a user through the operating portion 8. The communication device causes the communication line control portion 2 to capture a transmission line 1 and the dialing portion 10 to transmit a calling signal by dialing the telephone number and stores the called party's telephone number in the called party's number storing portion 9. When a busy-tone from the called terminal was detected by the busy-tone detecting portion 5 or no response from the called terminal was received for a specified period, the communication device operates the communication line control portion 2 to release the communication line 1, stops the transmission of the call signal by the dialing portion 10 and then turns on the automatic recall function.

After the automatic recall function was turned on, the main control portion 22 monitors whether a call signal is detected or not by the call detecting portion 4 and whether a certain preset time elapsed or not according to a signal of a timer (not shown) (Steps F201 and F202).

Judging the preset time elapsed (Step F202), the main control portion 22 controls the communication line control portion 2 to capture the communication line 1 (Step F203) and drives the dialing portion 10 to call the distant telephone number stored in the called party's number storing portion 9 (Step F204).

When the called distant terminal responded to the transmitted call and a busy-tone was detected by the busy-tone detecting portion 5 before the elapse of a certain preset time (Step F207), the main control portion 22 recognizes the communication method preset by the user (Step F208) and, if the preset method is speech communication, it controls the telephone portion 3 to begin the transmission/receipt of speech data to/from the distant terminal (Step F209). When a command to terminate the communication is then input through the operating portion during the communication (Step F210), the main control portion 22 causes the telephone portion 3 to terminate the speech communication with the distant terminal (Step F210), controls the communication line control portion 2 to release the communication line 1 (Step F211) and turns off the recall function. The main control portion 22, if the image communication is preset, controls the facsimile portion 21 to begin the image-data communication with the distant terminal (Step F215). On completion of the image-data transmission (Step F216), the main control portion 22 causes the facsimile portion 21 to terminate the image-data communication with the distant terminal (Step F217), controls the communication line control portion 2 to release the communication line 1 (Step F212) and turns off the automatic recall function.

The desired method of communication with the distant terminal to be called by using the automatic recall function may be recognized for example by examining whether an original document set on the facsimile portion 21 or stored in a memory thereof or whether a polling function is set on the facsimile portion 21.

When a busy-tone transmitted over the communication line 1 was detected by the busy-tone detecting portion 5 after transmission of the call (Step F205) or no response from the called distant terminal was received before the elapse of the preset time (Step F206), the main control portion 22 controls the communication line control portion 2 to release the communication line 1 (Step F213) and examines how many times a calling attempt was repeated (Step F214). The main control portion 22 turns off the automatic recall function if the call has been repeated by the certain preset number of times. If the number of calls did not reach the preset value, the main control portion 22 performs again the above described control procedure (Steps F201 to F217) of monitoring the detection of a call incoming over the communication line according to the call detecting portion 4 and the elapse of the preset time according to the timer (not shown).

Having detected a calling signal incoming over the communication line 1 by the incoming call detecting portion 4 (Step F201) during the above described control operation steps of monitoring the detection signal of the incoming call detecting portion 4 and the elapse of the preset time according to the timer (not shown), the main control portion 22 compares the calling terminal telephone number received and demodulated by the calling party's number demodulating portion 6 with the distant terminal telephone number stored in the called party's number storing portion 9 (Step F221). When the telephone number of the call was identified with the telephone number of the called distant terminal, the main control portion 22 causes the announcing portion 11 to inform a user of having received a call from the distant terminal that is also being called by the automatic recall function (Step F222).

The announcement may be conducted for example by lighting a specific LED, displaying a message of receiving a call from a distant terminal being recalled by the automatic recall function, generating a sound signal or vibrating the device body at a specified frequency if the device is an easily portable telephone set.

When a command to start the transmission of various kinds of data is input through the operating portion 8 during the information being given by the announcing portion (Step F223), the main control portion 22 causes the communication line control portion 2 to capture the communication line 1 (Step F224), then recognizes the communication method requested by the calling terminal according to a signal incoming over the communication line 1 and compares the recognized method with the method preset by the user (Step F225) and sets a Stop Flag in the state <1> only in the case the communication method required by the calling terminal corresponds to the communication method preset by the user (Step F226).

When the main control portion 22 judged the communication method requested by the calling distant communication device to be speech communication according to a signal incoming over the communication line 1 captured by the communication line control portion 2 (Step F227), it controls the telephone portion 3 to start the transmission/receipt of speech data to/from the distant terminal (Step F228). When a command to terminate the communication is input through the operating portion 8 during the communication (Step F229), the main control portion 22 causes the telephone portion 3 to finish the speech communication with the distant terminal (Step F230), controls the communication line control portion 2 to release the communication line 1 (Step F231). When the communication method requested by the calling distant communication device is judged to be the image communication (Step F227), the main control portion 22 drives the facsimile portion 21 to start the image-data communication with the distant communication device (Step F233). On completion of the image-data transmission (Step F234) the main control portion 22 causes the facsimile portion 21 to terminate the communication with the distant communication device (Step F235) and controls the communication line control portion 2 to release the communication line 1 (Step F231).

After the speech or image communication was terminated and the communication line 1 was released, the main control portion 22 examines whether the Stop Flag is set in the state <1> indicating that the communication method requested by the automatic recall function corresponds to the communication method requested by the calling distant communication device (Step F232). The main control portion 22 recognizes the Stop Flag set in the state <1> and then turns off the automatic recall function. If not, the main control portion 22 executes again the before-mentioned basic control procedure (Steps F201 to F217).

In the state that the main control portion executes the basic control procedure for monitoring whether an incoming call arrives or not according to a detection signal from the call detecting portion 4 and whether the preset time elapsed or not according to a signal from the timer (not shown), it is assumed that a calling signal incoming through the communication line 1 is detected by the call detecting portion 4 (Step F201) and the calling terminal telephone number received and demodulated by the calling party's number demodulating portion 6 does not correspond with the distant terminal telephone number stored in the called party's number storing portion 9 (Step F221). In this case, the main control portion 22 receives a speech-data transmission starting command input through the operating portion 8 (Step F236), operates the communication line control portion 2 to capture the communication line 1 (Step F237) and recognizes the communication method requested by the calling distant communication device according to a signal incoming over the captured communication line 1. When the speech communication is requested (Step F238), the main control portion 22 operates the telephone portion 3 to start the speech-data transmission to and from the calling distant communication device (Step F239). When a command to terminate the speech communication is then given through the operating portion 8 (Step F240), the main control portion 22 controls the telephone portion 3 to terminate the speech communication with the calling distant communication device (Step F241) and causes the communication line control portion 2 to release the communication line 1 (Step F245). When the communication method requested by the calling distant communication device is judged to be the image communication (Step F238), the main control portion 22 drives the facsimile portion 21 to start the image communication with the distant communication device (Step F242). On completion of the image-data transmission (Step F243) the main control portion 22 causes the facsimile portion 21 to terminate the communication with the distant communication device (Step F244) and controls the communication line control portion 2 to release the communication line 1 (Step F245).

After the speech or image communication was terminated and the communication line 1 was released, the main control portion 22 performs again the basic control procedure (Steps F201 to F217).

The above-described control procedure enables the communication device either to automatically cancel the automatic recall function being driven in case when a call is received from a distant party who is designated to be called by the automatic recall function and the user may do the desired kind of communication with the party by utilizing the current established call or to automatically keep the automatic recall function alive in case when the user may not conduct the desired kind of communication by utilizing the call established from the distant party.

Another example of the operation of the above-described communication device using its automatic recall function will be described below with reference to the flow chart shown in FIGS. 8A and 8B. A basic control procedure of this embodiment is identical to that shown in the foregoing embodiment and, therefore, omitted from the further description.

Now, it is assumed that the main control portion is performing the basic control procedure monitoring whether an incoming call arrives or not according to a detection signal from the call detecting portion 4 and whether the preset time elapsed or not according to a signal from the timer (not shown) and, in the meantime, a calling signal incoming through the communication line 1 is detected by the call detecting portion 4. In this instance, the main control portion 22 compares the calling terminal telephone number received and demodulated by the calling party's number demodulating portion 6 with the distant terminal telephone number stored in the called party's number storing portion 9 (Step F251). Having judged the calling party's telephone number is identical to the telephone number of the recalled distant communication device, the main control portion 22 causes the announcing portion 11 to inform a user of having received a call from the distant terminal being called by the automatic recall function (Step F252).

When a command to start the speech data transmission is then input through the operating portion 8 during the announcement being given (Step F253), the main control portion 22 causes the communication line control portion 2 to capture the communication line 1 (Step F254) and then recognizes the communication method requested by the calling terminal according to a signal incoming over the communication line 1 and compares the recognized method with the method preset by the user (Step F255) and sets the Stop Flag in the state <1> only in the case the communication method required by the calling terminal corresponds with the communication method preset by the user (Step F256).

Having judged the communication mode requested by the calling distant communication device to be speech communication according to a signal incoming through the communication line 1 captured by the communication line control portion 2 (Step F257), the main control portion 22 controls the telephone portion 3 to start the transmission/receipt of speech data to/from the distant communication device (Step F258). A command to start image-data transmission is then input through the operating portion 8 during the speech-data transmission (Step F259). The main control portion 22 sets the Stop Flag in the state <1> (Step F264) and then causes the facsimile portion 21 to start the image communication with the distant communication device (Step F265). When a command to terminate the speech communication is input through the operating portion 8 during the speech communication (Step F260), the main control portion causes the telephone portion 3 to finish the speech communication with the distant communication device (Step F261) and controls the communication line control portion 2 to release the communication line 1 (Step F262).

If desired image data could not be transmitted or received to or from the distant communication device due to the occurrence of a transmission error after changing the communication method from the speech communication to the image communication, the main control portion 22 may set the Stop Flag in the state <0> and performs the basic control procedure (Steps F201 to F217).

When the communication method requested by the calling distant communication device is judged, from a signal incoming over the transmission line 2 captured by the communication line control portion 2, to be the image communication (Step F257), the main control portion 22 drives the facsimile portion 21 to start the image-data communication with the distant communication device (Step F265). On completion of the image-data transmission (Step F266), the main control portion 22 examines whether the Stop Flag is set in the state <1> (Step F267). If not, the main control portion 22 sets the Stop Flag in the state <1> (Step F269), then it requests to conduct speech communication in the image-data communication protocol (Step F270) and causes the telephone portion 3 to start the speech communication with the distant communication device (Step F258). When the flag is set in the state <1>, the main control portion 22 causes the facsimile portion 21 to terminate the image communication with the distant communication device (Step F268) and controls the communication line control portion 2 to release the communication line 1 (Step F262).

After the speech or image communication was terminated and the communication line 1 was released, the main control portion 22 examines whether the Stop Flag is set in the state <1> (Step F263). With the Stop Flag set in the state <1>, the main control portion 22 turns off the automatic recall function. If not, the main control portion 22 executes again the before-mentioned basic control procedure (Steps F201 to F217).

The main control portion 22 executes the basic control procedure for monitoring whether an incoming call arrives or not according to a detection signal from the call detecting portion 4 and whether the preset time elapsed or not according to a signal from the timer (not shown). In the meantime, a calling signal incoming through the communication line 1 is detected by the call detecting portion 4 (Step F201) and, in this instance, the calling terminal telephone number received and demodulated by the calling party's number demodulating portion 6 does not correspond with the distant terminal telephone number stored in the called party's number storing portion 9 (Step F221). The main control portion 22 receives a speech-data communication starting command input through the operating portion 8 (Step F271), operates the communication line control portion 2 to capture the communication line 1 (Step F272) and recognizes the communication method requested by the calling distant communication device according to a signal incoming over the captured communication line 1. When the speech communication is requested (Step F273), the main control portion 22 operates the telephone portion 3 to start the speech-data transmission to and from the calling distant communication device (Step F274). When a command to terminate the speech communication is given through the operating portion 8 (Step F275), the main control portion 22 controls the telephone portion 3 to terminate the speech communication with the calling distant communication device (Step F276) and causes the communication line control portion 2 to release the communication line 1 (Step F280). When the communication mode requested by the calling distant communication device is judged to be the image communication (Step F273), the main control portion 22 drives the facsimile portion 21 to start the image communication with the distant communication device (Step F277). On completion of the image-data transmission (Step F278), the main control portion 22 causes the facsimile portion 21 to terminate the communication with the distant communication device (Step F279) and controls the communication line control portion 2 to release the communication line 1 (Step F280).

After the speech or image communication was terminated and the communication line 1 was released, the main control portion 22 performs again the basic control procedure (Steps F201 to F217).

The above-described control procedure enables the communication device to automatically cancel the automatic recall function in a particular case that a call is received from a party whom the user is calling by using the automatic recall function and the user may conduct the desired kind of communication by utilizing the established call.

The advantages of the present invention are as follows.

As described above, the communication device according to the present invention can notify a user of provably having the need to stop the automatic recall function when the device accepts a call from a distant communication device that happens to be a distant communication device being called by the automatic recall function and the user may also conduct the desired communication with the distant communication device. The user may without fail turn off the automatic recall function after he or she finishes the necessary communication with the distant party. The distant party will not be disturbed by unpleasant unnecessary call.

The communication device according to another aspect of the present invention can automatically cancel the automatic recall function when the device receives a call from a distant communication device that happens to be a distant communication device to be called by the automatic recall function and the user could finish the necessary business with the distant party during the communication originated from the distant party. Th is feature makes the user free from doing the complicated procedure for canceling the automatic recall function and eliminates the possibility of sending an unnecessary and unpleasant call to the distant party.

The communication device according to another aspect of the present invention can keep alive the automatic recall function when the device receives a call from a distant communication device that happens to be a distant communication device to be called by the automatic recall function but the user could not finish the necessary business with the distant party by the communication established from the party because the communication method desired by the user differs from the current communication method requested by the distant party. This feature makes the user free from doing the complicated procedure, eliminates the possibility of sending an unnecessary and unpleasant call to the distant party and enables the user to surely do the desired business with the distant designated party.

The communication device according to another aspect of the present invention can keep alive the automatic recall function when the device received a call from a distant communication device that happens to be a distant communication device designated to be called by the automatic recall function but the user could not finish the necessary business with the distant party by the communication originated from the party because the communication method desired by the user differs from the current communication method requested by the distant party and can automatically cancel the automatic recall function when the communication method was changed from the current method to the other and the user could make an end of the desired business with the party. This feature makes the user free from doing the complicated procedure and eliminates the possibility of giving the distant party an unnecessary and unpleasant call.

The communication device according to another aspect of the present invention can automatically cancell the automatic recall function when the device received a call from a distant communication device that happens to be a distant communication device designated to be called by the automatic recall function and the user could finish the necessary business with the distant party by the communication established from the party through the communication method desired by the user differs from the current communication method requested by the distant party. This feature makes the user free from doing the complicated procedure and eliminates the possibillty of giving the party an unecessary and unpleasant call.

What is claimed is:

1. A communication device provided with an automatic recall function for repeatedly calling a designated distant terminal by automatically redialing a designated telephone number until the terminal responds to the call, which is further provided with a receiving means for receiving a telephone number of a calling party when a call from said calling party incomes over a communication line, an announcing means for giving a specified notification when the calling party's telephone number received by the receiving means is identified with the designated telephone number of the distant terminal to be repeatedly called by the automatic recall function being alive, and a control means for canceling the automatic recall function in response to a stop command input during the notification being given by the announcing means.

2. A communication device provided with an automatic recall function for repeatedly calling a designated distant terminal by automatically redialing a designated telephone number at specified intervals until the distant terminal responds to the call, which is further provided with a receiving means for receiving a telephone number of a calling party when a call from said party incomes over a communication line, and a control means for canceling the automatic recall function when the calling party's telephone number received by the receiving means is identified with the designated telephone number of the distant terminal to be repeatedly called by the automatic recall function being alive.

3. A communication device as defined in claim 2, which includes at least an image communication facility for transmitting/receiving image data and a speech communication facility for transmitting/receiving speech data and in which the control means causes the automatic recall function to be kept alive when the calling party's telephone number received by the receiving means is identified with the designated telephone number of the distant terminal to be repeatedly called by the automatic recall function being alive, and a method of communication originated with the call from the calling party differs a method of communication requested by the automatic recall function being in use.

4. A communication device as defined in claim 3, wherein the control means cancels the automatic recall function when the calling party's telephone number received by the receiving means is identified with the designated telephone number of the distant terminal to be called by the automatic recall function being alive and a method of communication originated with the call from the calling party differs from a communication method requested by the automatic recall function being alive, and communication by a method requested by the automatic recall function is allowed to interrupt communication being conducted with the calling terminal.

5. A communication device as defined in claim 2, which includes at least an image communication facility for transmitting/receiving image data and a speech communication facility for transmitting/receiving speech data and in which the control means causes the communication by a method requested by the automatic recall function to interrupt in the communication originated by the call from the calling party and then cancels the automatic recall function when the calling party's telephone number received by the receiving means is identified with the designated telephone number of the distant terminal to be repeatedly called by the automatic recall means being alive and the method of the communication being conducted with the calling party differs from the communication method requested by the automatic recall function being in use.

* * * * *